UNITED STATES PATENT OFFICE.

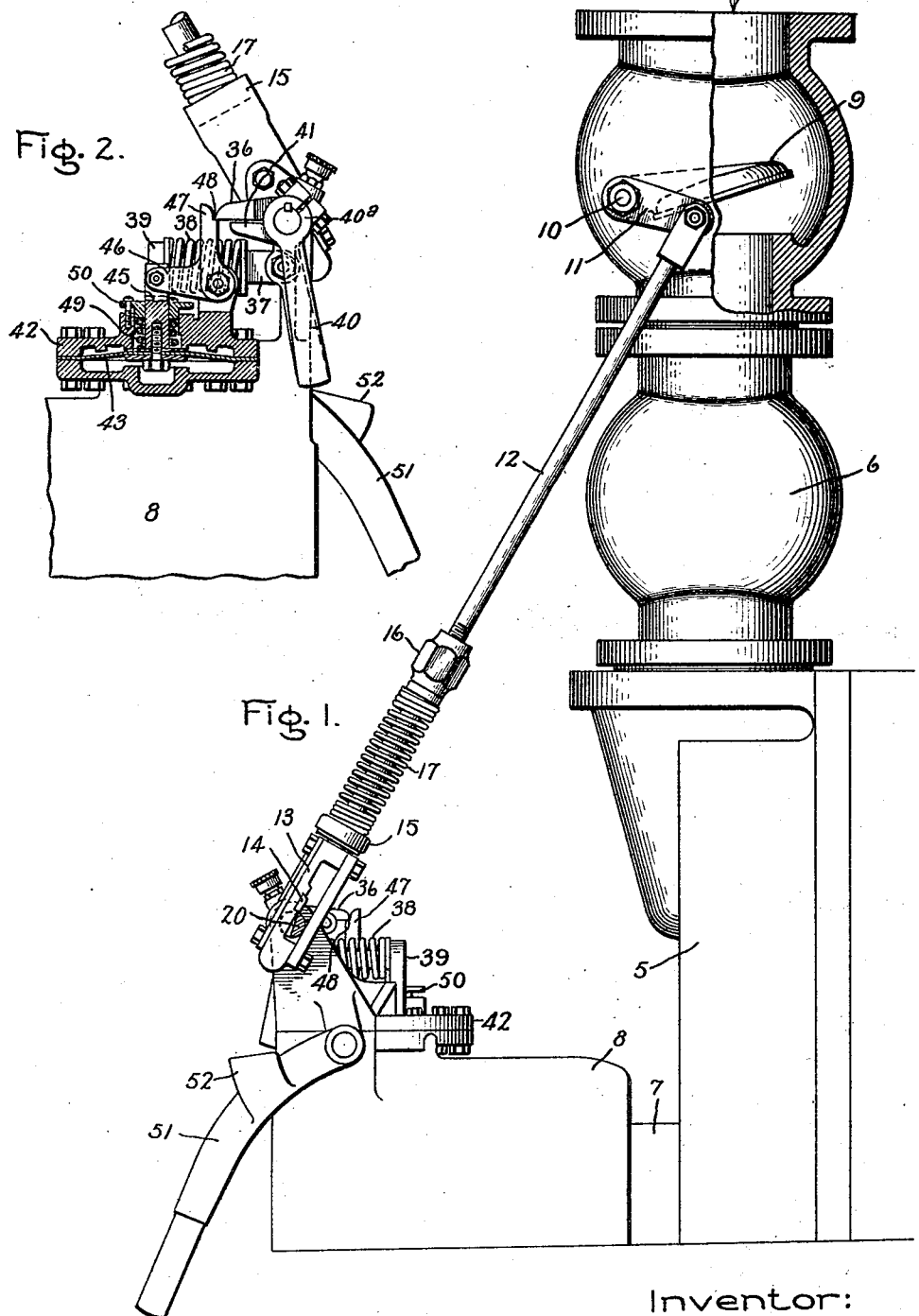

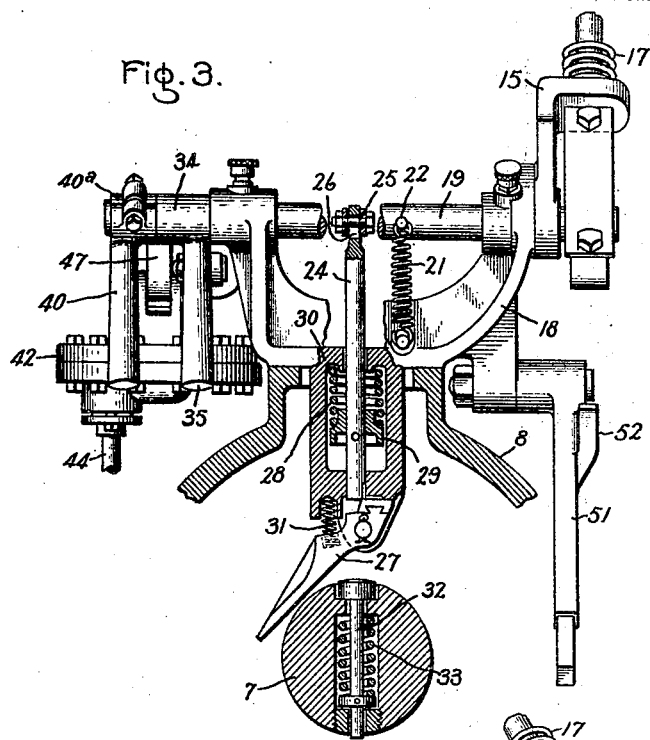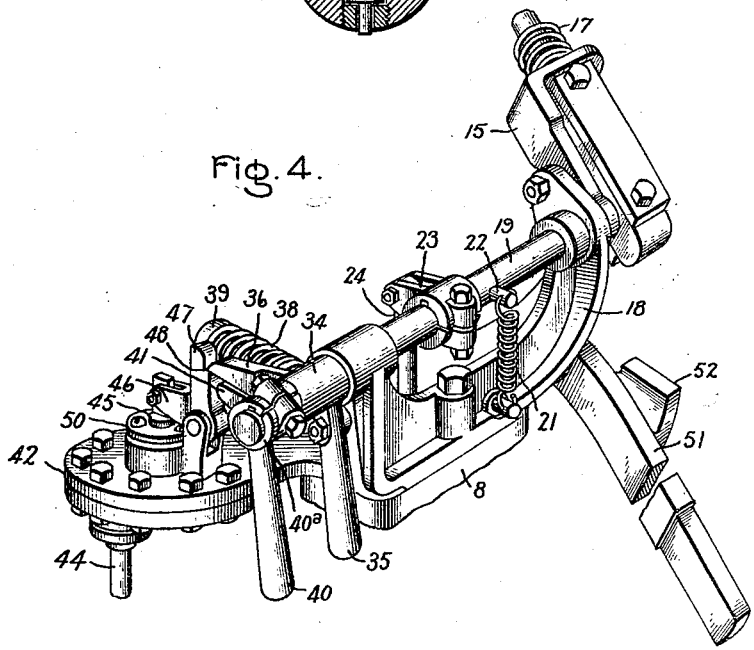

EDGAR D. DICKINSON, OF SCHENECTADY, NEW YORK, ASSIGNOR TO GENERAL ELECTRIC COMPANY, A CORPORATION OF NEW YORK.

EMERGENCY MECHANISM.

1,409,529.   Specification of Letters Patent.   Patented Mar. 14, 1922.

Application filed April 10, 1919. Serial No. 289,032.

*To all whom it may concern:*

Be it known that I, EDGAR D. DICKINSON, a citizen of the United States, residing at Schenectady, in the county of Schenectady, State of New York, have invented certain new and useful Improvements in Emergency Mechanism, of which the following is a specification.

The present invention relates to emergency valve mechanisms such as are used in connection with elastic fluid turbines to shut off the supply of elastic fluid thereto in case of abnormal operating conditions and has for its object to provide an improved arrangement by which the valve mechanism will be tripped to close the valve upon the occurrence of any one of two or more abnormal conditions.

In the present instance, the invention is specifically described in connection with an arrangement whereby the valve mechanism is tripped in case of excess speed or of a failure of the lubricating pressure but it will be understood that this is only by way of example.

For a consideration of what I believe to be novel and my invention, attention is directed to the accompanying description and the claims appended thereto.

In the drawing, Fig. 1 is an end view of a mechanism embodying my invention; Fig. 2 is a view similar to Fig. 1 but taken from the other end, certain parts being shown in section; Fig. 3 is a side view of the mechanism looking toward the end of the machine, certain parts being broken away and others shown in section, and Fig. 4 is a perspective view.

Referring to the drawing, 5 indicates a prime mover such as an elastic fluid turbine and 6 a conduit through which elastic fluid is admitted thereto. The shaft of the turbine is indicated at 7 and one of the bearings at 8. In conduit 6 is a suitable valve 9. This valve may be of any desired structure; in the present instance it is shown as being a simple flap valve carried on the shaft 10 to which is attached an operating arm 11. Connected to operating arm 11 is a rod 12, the lower end of which terminates in a rectangular frame 13 in which is a catch plate 14. Rod 12 is guided by a bracket 15 and surrounding the lower end of rod 12 with one end connected to the bracket 15 and the other end to an adjusting nut 16 is a spring 17. When rod 12 is pushed upward to open valve 9, spring 17 is put under tension so that it has a tendency to force the valve toward closed position. In other words, it forms a means for biasing the valve toward closed position. Mounted on bearing 8 is a U-shaped bracket 18 in the arms of which is pivoted a trip shaft 19. Bracket 15 surrounds shaft 19 and is bolted to a projection on one of the arms of bracket 18. One end of trip shaft 19 projects through rectangular frame 13 and has a cutaway portion forming a latch 20 which is adapted to engage catch plate 14. At 21 is a spring connected at one end to frame 18 and at the other end to a pin 22 which projects from shaft 19. Spring 21 acts to turn shaft 19 in a direction to hold catch 20 in engagement with catch plate 14. In Fig. 1 catch 20 is shown as being in engagement with catch plate 14 so that valve 9 is open. To close the valve, it will be clear that it is necessary to turn shaft 19 against the action of spring 21 so as to move the catch 20 out of engagement with catch plate 14, whereupon spring 17 will pull down on rod 12 and close the valve. Connected to shaft 19 is a bifurcated arm 23 between the outer ends of the furcations of which is fastened the upper end of a plunger rod 24. The connection between the upper end of plunger rod 24 and lever arm 23 is formed as shown in Fig. 3 by means of a bolt 25 which passes through the slot 26 in rod 24. By this means it will be seen that there is a lost motion connection between arm 23 and rod 24 so that shaft 19 may be turned to a limited extent without necessitating a movement of rod 24. Spring 21 normally holds bolt 25 at the top of slot 26 and maintains catch 20 in engagement with catch plate 14. The lower end of plunger rod 24 rests on a pivoted trip finger 27 and is normally pressed downward by a spring 28 which surrounds plunger rod 24 and at one end engages a collar 29 on the plunger rod and at the other end engages a fixed abutment 30. Trip finger 27 is pressed toward a position where it is under plunger rod 24 by a spring 31 and the outer end of trip finger 27 projects down adjacent to shaft 7. In an opening in shaft 7 is a plunger 32 held by a spring 33. The arrangement is such that when the speed of the shaft reaches a predetermined high value, plunger 32 will be thrown out by centrifugal force against the action of spring 33 and will engage the end of trip finger 27 and knock it from under plunger rod 24. This releases plunger rod 24 which is forced downward by spring 28 thus turning shaft 19 against the action of spring 21 and releasing catch 20. Plunger 32 and spring 33 are shown diagrammatically and only by way of example of a speed responsive arrangement and it will be understood that any suitable arrangement for tripping finger 27 may be used. Loosely mounted on shaft 19 at the end remote from that at which catch 20 is located is a collar 34 to which is connected an operating handle 35 and a lever 36. Hinged to operating handle 35 is a spring plug 37, Fig. 2, to which is attached one end of a spring 38, the other end of which is attached to a fixed abutment 39. Spring 38 tends to turn shaft 19 in a direction to release catch 20, i. e., in a direction opposite to that in which spring 21 tends to turn it. Fixed to shaft 19 adjacent collar 34 is a split collar 40ª having a handle 40 and an arm 41 thereon, the arm 41 being located directly beneath lever 36 as well shown in Fig. 4. Supported by bearing 8 adjacent to bracket 18 is a pressure responsive mechanism comprising a casing 42 in which is a diaphragm 43. Connected to casing 42 beneath diaphragm 43 is a pressure pipe 44. Connected to diaphragm 43 and projecting upwardly through an opening in casing 42 is a pin 45 having a flattened end to which is connected an arm 46 of a bell crank lever, the other arm 47 of which projects vertically and has a catch 48. The bell crank lever is pivoted at its elbow to lugs projecting from casing 42. Surrounding pin 45 is a spring 49 which at one end pushes against the diaphragm 43 and at the other end against a fixed abutment 50. This spring tends to force the diaphragm downward. As long as the pressure under diaphragm 43 is sufficient to hold the diaphragm up against spring 49, catch 48 will be held under the end of lever 36. Pivoted to a lug on bracket 18 is a resetting lever 51 provided with a portion 52 adapted to engage the lower end of frame 13.

The operation is as follows:—Assume that the turbine is running and that valve 9 is open; also that there is a suitable supply of oil pressure to the bearings and that the speed is not excessive. Under these conditions the various parts are in the positions shown in the drawing. Valve 9 is held open by catch 20 which is engaged under catch plate 14 and spring 17 is under tension. Plunger rod 24 is held up against the action of spring 28 by trip finger 27 and the end of lever 36 rests on catch 48 which is held up by the pressure under diaphragm 43. Spring 38 is under compression. If now the speed should become excessive, plunger 32 will move radially outward against the action of spring 33, striking trip finger 27 and knocking it from under the end of plunger rod 24. Spring 28 will then force plunger rod 24 downward thus turning shaft 19 against the action of spring 21 and moving catch 20 from engagement with catch plate 14 whereupon spring 17 will immediately pull valve 9 shut. Since sleeve 34 is loose on shaft 19 it will be clear that shaft 19 can turn independently of lever 36 and that this lever and the parts associated therewith will not be affected although operating handle 40 and arm 41 will turn with the shaft. To reset the device lever 51 is moved upward to engage the bottom of frame 13 to move valve 9 to open position after which handle 40 is utilized to turn shaft 19 thereby raising plunger rod 24 so that trip finger 27 may again drop under the bottom of it. At the same time this turning of shaft 19 brings catch 20 in engagement with catch plate 14.

On the other hand should the oil pressure to the bearings fail then spring 49 will force diaphragm 43 downward thus pulling down on arm 46 of the bell crank lever and moving catch 48 from beneath lever 36. As soon as lever 36 is released spring 38 which is under compression turns sleeve 34 to bring lever 36 into engagement with arm 41 which will thereupon turn shaft 19 and trip the valve mechanism as above described. When this occurs lever arm 23 moves independently of plunger rod 24, bolt 25 moving downward in slot 26. After the oil pressure has been restored the mechanism is reset by first turning sleeve 34 by means of operating handle 35 to bring lever 36 back into engagement with catch 48, at the same time putting spring 38 under compression. The valve is then reset in the manner already described, being first opened by means of lever 51 and caught open by turning shaft 19 by means of handle 40 providing spring 21 does not in itself turn the shaft to bring catch 20 into engagement with catch plate 14.

If it is desired to trip valve 9 by hand it may be done by turning shaft 19 by means of handle 40, and this will not disturb the setting of either the speed controlled trip or the pressure controlled trip since bolt 25 can move downward in slot 26 and sleeve 34 is loose on shaft 19.

It will thus be seen that with my improved arrangement the valve may be tripped manually or upon the occurrence of either of two abnormal operating conditions and that in no instance do the mechanisms utilized for tripping the valve interfere with each other. However, in order to maintain the valve open all the mechanisms must be in working condition.

What I claim as new and desire to secure by Letters Patent of the United States, is:—

1. In combination, a prime mover, a valve, means biasing the valve toward closed position, a catch for holding it open against said biasing means, a shaft which when turned releases said catch, a means for turning said shaft which is operated in case of excess speed of the prime mover, and a second means for turning said shaft independently of the first named means in case the supply of oil to the bearings fails.

2. In combination, a prime mover, a valve, means biasing the valve toward closed position, a catch for holding it open against said biasing means, a shaft which when turned releases said catch, a handle by means of which said shaft may be turned manually, a spring pressed plunger rod connected to said shaft by a lost motion connection, means for holding said rod against the action of the spring pressure, means for releasing said holding means, a sleeve which loosely surrounds the shaft, spring means for turning it, mechanism responsive to an operating connection of the prime mover for holding said sleeve against the action of said spring means, and means carried by the sleeve and shaft which engage each other to turn the shaft when said mechanism releases the sleeve.

3. In combination, a valve, means biasing the valve toward closed position, a shaft, a catch on the shaft for holding the valve open, said catch being released when the shaft is turned, a plunger rod connected to the shaft by a lost motion connection, means for holding said rod against movement, a sleeve loosely mounted on the shaft, a spring which tends to turn the sleeve, means for holding said sleeve against turning movement, cooperating parts on the sleeve and shaft whereby when the sleeve turns it will turn the shaft, and separate means for releasing said holding means.

4. In combination, a prime mover, a valve, means biasing the valve toward closed position, a shaft, a catch on the shaft for holding the valve open, said catch being released when the shaft is turned, a plunger rod connected to the shaft by a lost motion connection, means for holding said rod against movement, a sleeve loosely mounted on the shaft, a spring which tends to turn the sleeve, means for holding said sleeve against turning movement, cooperating parts on the sleeve and shaft whereby when the sleeve is turned by the spring it will turn the shaft, and independent means each responsive to an operating condition of the prime mover for releasing said holding means.

5. In combination, a prime mover, a valve, means biasing the valve toward closed position, a shaft, a catch on the shaft for holding the valve open, said catch being released when the shaft is turned, a plunger rod connected to the shaft by a lost motion connection, means for holding said rod against movement, a sleeve loosely mounted on the shaft, a spring which tends to turn the sleeve, means for holding said sleeve against turning movement, cooperating parts on the sleeve and shaft whereby when the sleeve is turned by the spring it will turn the shaft, means responsive to excess speed for releasing one of said holding means, and means responsive to pressure for releasing the other of said holding means.

6. In combination, a prime mover, a valve, means biasing the valve toward closed position, a shaft, a catch on the shaft for holding the valve open, said catch being released when the shaft is turned, a plunger rod connected to the shaft by a lost motion connection, means for holding said rod against movement, a sleeve loosely mounted on the shaft, a spring which tends to turn the sleeve, means for holding said sleeve against turning movement, cooperating parts on the sleeve and shaft whereby when the sleeve is turned by the spring it will turn the shaft, means responsive to excess speed for releasing one of said holding means, means responsive to pressure for releasing the other of said holding means, a resetting handle on said sleeve for resetting the sleeve and putting said spring under compression, and a resetting handle on the shaft.

7. The combination with a prime mover, of a valve for controlling the admission of elastic fluid thereto, a catch which when released effects the closing of the valve, a shaft the turning of which releases said catch, a means for turning said shaft which is operated in case of excess speed of the prime mover, and a second means for turning said shaft independently of the first-named means in case the supply of oil to the bearings fails.

8. The combination with a prime mover, of a valve for controlling the admission of elastic fluid thereto, a catch which when released effects the closing of the valve, a shaft the turning of which releases said catch, and two automatically-actuated devices responsive to abnormal operating conditions of the prime mover either of which is movable independently of the other to turn the shaft to release said catch.

In witness whereof, I have hereunto set my hand this 9th day of April, 1919.

EDGAR D. DICKINSON.